United States Patent Office 3,014,043
Patented Dec. 19, 1961

3,014,043
SEROTONIN ANTAGONISTS
Walter A. Gaines, Rahway, Meyer Sletzinger, North Plainfield, and William Ruyle, Scotch Plains, N.J., assignors to Merck & Co., Inc., Rahway, N.J., a corporation of New Jersey
No Drawing. Filed Feb. 8, 1957, Ser. No. 638,909
3 Claims. (Cl. 260—319)

This invention relates to tryptamine compounds, more particularly to tryptamine compounds having activity as serotonin antagonists, and to processes for making the same.

Serotonin, which is also known as 3-(2-aminoethyl)-5-hydroxyindole and 5-hydroxytryptamine, is present in the blood serum and in the brain of man and other mammals. This compound appears to be necessary for proper functioning of the central nervous system. However, this compound causes various undesirable side effects, notably high blood pressure, when an excessive amount of this compound is present in the system.

High blood pressure and other undesirable symptoms of excessive amounts of serotonin in the system can be controlled by the administration of a serotonin antagonist. Certain derivatives of serotonin, notably 1-benzyl-2-methyl-3-(2-aminoethyl) - 5 - methoxyindole, have activity as serotonin antagonists. Prior to the present invention the only known methods for making these serotonin antagonist compounds were involved and had a low over-all yield.

An object of the present invention is to provide a new process for making serotonin derivatives having serotonin antagonist activity.

A further object of the present invention is to prepare new tryptamine compounds having a greater serotonin antagonist activity than presently known tryptamine compounds.

These and other objects will be apparent from the specification which follows.

The tryptamine compounds having serotonin antagonist activity which may be prepared according to the process of the present invention have the general formula

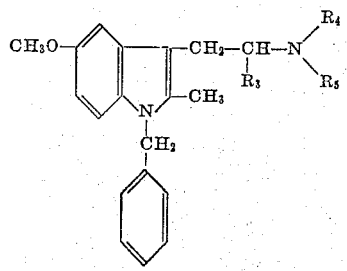

and the acid addition salts thereof. In the above structural formula $R_3$ is selected from the group consisting of hydrogen and the methyl radical; $R_4$ and $R_5$ when taken separately are selected from the group consisting of hydrogen, lower alkyl and lower alkenyl radicals containing from 1 to 8 carbon atoms and when taken together with the N atom constitute a radical selected from the group consisting of 1-pyrrolidyl and 1-piperidyl. The acid addition salt may be any of the common acid addition salts, such as the hydrochloride, sulfate, or acetate.

The novel serotonin antagonists according to this invention have the general formula

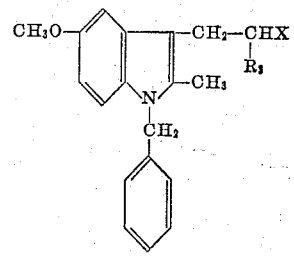

and the acid addition salts thereof. These compounds are characterized by the fact that a methyl group is attached to the beta carbon atom of the side chain extending from the 3-position of the indole nucleus. Both the free amines represented by the above structural formula and their acid addition salts, such as the hydrochloride, sulfate and the acetate, have improved anti-serotonin activity, as compared to previously-known tryptamine compounds.

According to the novel process of this invention a phenylhydrazine compound is combined with a haloalkyl ketone in an acidic medium to form an indole having an haloalkyl side chain attached to the 3-position. This product is aminated to form the desired tryptamine compound. The equation for this reaction may be represented as follows:

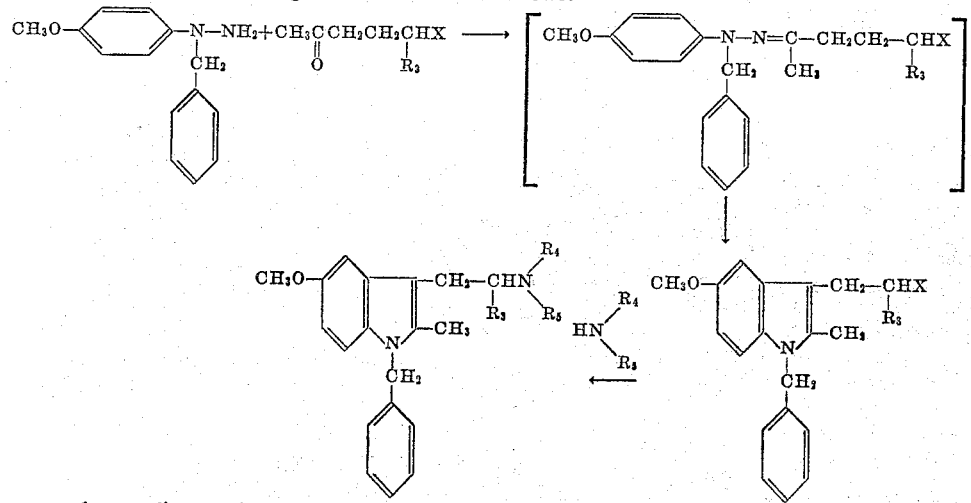

In the above equation X is a halogen having an atomic weight in the range of 35 to 80, that is, X is either chlorine or bromine, and $R_3$, $R_4$, and $R_5$ are as defined above. While the final product has been indicated as the free tryptamine compound in the above equation, it is understood that the tryptamine compound may be recovered either as such or as an acid addition salt, preferably as the latter.

The phenylhydrazine compound used as the reagent in the process of this invention is 1-benzyl-1-(p-methoxyphenyl)hydrazine or an acid addition salt thereof, such as the hydrochloride or sulfate. This compound can be prepared by first preparing p-methoxyphenylhydrazine as disclosed in Blaikie and Perkin, J. Chem. Soc. (London), volume 125, pp. 296, 313 (1924), followed by benzylation according to the procedure of Audrieth et al., J. Org. Chem., volume 6, page 417, (1941), or according to the Audrieth procedure as modified by Shaw, J. Am. Chem. Soc., volume 77, page 4319 (1955).

Ketones which are suitable reagents in the present invention include 5-chloropentanone-2, 5-bromopentanone-2- 5-chlorohexanone-2, and 5-bromohexanone-2. These compounds, it will be noted, have an active methylene group adjacent to the ketone group.

The reaction between the phenylhydrazine compound and the ketone is carried out in an acidic medium. Preferably the solvent is an organic solvent. The lower aliphatic alcohols, such as methanol, ethanol, propanol, isopropanol, and the butyl alcohols are particularly desirable as solvents. Other suitable solvents include glacial acetic acid, propionic acid, and other solvents in which the reagents are soluble. In the event that the organic solvent is not an acid, the solvent is acidified by the addition of an acidic reagent, preferably in anhydrous form. Examples of suitable acidic reagents for this purpose are hydrochloric, sulfuric, and acetic acids, zinc chloride, boron trifluoride, and the like.

The reaction between the phenylhydrazine compound and the ketone results in a haloalkylindole having the general formula

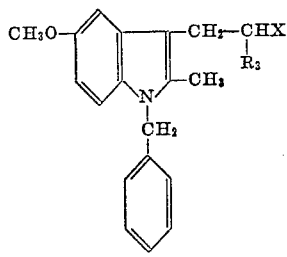

where $R_3$ and X are as defined above.

A phenylhydrazone having the general formula

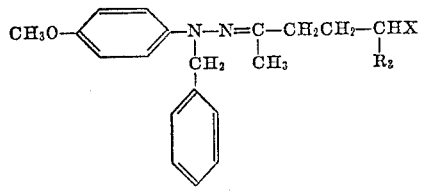

is formed as an intermediate in the reaction of the ketone and phenylhydrazine reagents. Preferably the phenylhydrazone is not isolated but is allowed to cyclize spontaneously to form the corresponding haloalkyl indole. However, the phenylhydrazone may be formed and isolated in an essentially neutral or weakly acidic reaction medium and then allowed to form the haloalkyl indole as described in the preceding paragraph.

Among the haloalkylindoles which may be formed according to the present invention are 1-benzyl-2-methyl-3-(2-chloroethyl) - 5 - methoxyindole, 1-benzyl-2-methyl-3-(2-chloropropyl) - 5-methoxyindole, 1-benzyl-2-methyl-3 - (2 - bromoethyl)-5-methoxyindole, and 1-benzyl-2-methyl-3-(2-bromopropyl)-5-methoxyindole.

Primary tryptamine compounds are produced by reaction of ammonia with the haloalkyl indole intermediate. For example, the primary tryptamines formed by reaction of the haloalkyl indoles named in the preceding paragraph with ammonia are 1-benzyl-2-methyl-3-(2-aminoethyl) - 5 - methoxyindole and 1-benzyl-2-methyl-3-(2-aminopropyl)-5-methoxyindole.

Suitable primary amines for reagents in this invention are hydrocarbon amines having from one to eight carbon atoms. Examples of such amines are methylamine, ethylamine, propylamine, isopropylamine, butylamine, tert.-butylamine, and benzylamine. Secondary tryptamine compounds formed by amination with methylamine include 1-benzyl-2-methyl-3-(2-methylaminoethyl)-5-methoxyindole and 1-benzyl-2-methyl-3-(2-methylaminopropyl)-5-methoxyindole. Other secondary tryptamines can be formed by amination of haloalkylindoles, such as those above named, with ethylamine, propylamine, isopropylamine, butylamine, isobutylamine, tert.-butylamine, allylamine, benzylamine, 1-phenylethylamine, and 2-phenylethylamine. Examples include 1-benzyl-2-methyl-3-(2-ethylaminoethyl)-5-methoxyindole, 1-benzyl-2-methyl-3-(2-propylaminoethyl)-5-methoxyindole, 1-benzyl-2-methyl-3-(2-isopropylaminoethyl)-5-methoxyindole, 1-benzyl-2 - methyl - 3 - (2-butylaminoethyl)-5-methoxyindole, 1-benzyl - 2 - methyl - 3 - (2 - tert. - butylaminoethyl) - 5-methoxyindole, 1-benzyl-2-methyl-3-(2-allylaminoethyl)-5 - methoxyindole, 1-benzyl-2-methyl-3-(2-benzylaminoethyl) - 5 - methoxyindole, 1 - benzyl-2-methyl-3-[2-(1-phenylethylamino)ethyl]-5-methoxyindole, 1 - benzyl-2-methyl - 3 - [2 - (1 - phenylethylamino)ethyl] - 5 - methoxyindole.

The secondary amines which may be used as reagents in the present process fall into two classes. The first class consists of the acyclic secondary amines, in which there are two hydrocarbon radicals, each containing from one to eight carbon atoms, attached to the nitrogen atom. Examples include dimethylamine, diethylamine, methyl tert.-butylamine, and methylbenzylamine. The second group of secondary amines are the heterocyclic amines, in which the ring has one heteronitrogen atom and the remainder carbon atoms. Examples of such amines are piperidine and pyrrolidine.

Among the tertiary tryptamine compounds formed by reaction of 1-benzyl-2-methyl-3-(2-chloroethyl)-5-methoxyindole or 1-benzyl-2-methyl-3-(2-bromoethyl)-5-methoxyindole with the secondary amines named in the preceding paragraph are 1-benzyl-2-methyl-3-(2-dimethylaminoethyl)-5-methoxyindole, 1-benzyl-2-methyl-3-(2-diethylaminoethyl)-5-methoxyindole, 1-benzyl-2-methyl-3-[2 - (N - methyl - N - tert. - butylamino)ethyl] - 5 - methoxyindole, 1 - benzyl-2-methyl-3-(2-N-benzyl-N-methylaminoethyl) - 5 - methoxyindole, 1-benzyl-2-methyl-3-[2-(piperidyl - 1) - ethyl]-5-methoxyindole, and 1-benzyl-2-methyl-3-[2-(pyrrolidyl-1)ethyl]-5-methoxyindole, and 1-benzyl - 2 - methyl - 3 - (2 - dimethylaminopropyl) - 5-methoxyindole. Other haloalykl indoles react similarly.

The tryptamine compound may be recovered from the reaction product mixture by any conventional procedure for recovering amines.

The invention will be now described with reference to the specific examples which follow:

*Example 1*

A mixture of 26.5 g. of 1-benzyl-1-(p-methoxyphenyl)-hydrazine hydrochloride, 12 g. of 5-chloropentanone-2, and 250 ml. of absolute ethanol was heated at reflux for 15 minutes. To this mixture were added 13 ml. of 7.8 N solution of hydrogen chloride in ethanol. Heating was continued at reflux temperature for 30 minutes. The reaction mixture was concentrated to a small volume in vacuo. The residue was added to a mixture of 100 ml. of benzene and 100 ml. of water and the resulting mixture was shaken and then allowed to separate. The aqueous layer was then separated from the benzene layer in which the 1-benzyl-2-methyl-3-(2-chloroethyl)-5-methoxyindole product was dissolved. The aqueous layer was extracted with two 50-ml. portions of benzene. The two portions of benzene were combined with the benzene solution of the product and washed with 50 ml. of water. A small amount of ethanol was added to clarify the layers. The resulting benzene solution was dried over anhydrous magnesium sulfate. The benzene was then removed by vacuum distillation. The product, which was 1-benzyl-2-methyl-3-(2-chloroethyl)-5-methoxyindole, was recrystallized from 100 ml. of absolute ethanol. Yield 21.1 g. (67.3%); M.P. 83°–86° C.

Example 2

A mixture consisting of 26.5 g. of (0.10 mole) of 1-benzyl-1-(p-methoxyphenyl) hydrazine hydrochloride, 13.5 g. (0.10 mole) of 5-chlorohexanone-2, 250 ml. of absolute ethanol, and 25 ml. of 7.8 N ethanolic hydrogen chloride were heated at reflux for 20 minutes. The mixture was gradually cooled while 200 ml. of water were added. An oily water-immiscible product was formed. This product, which was crude 1-benzyl-2-methyl-3-(2-chloropropyl)-5-methoxyindole, crystallized on standing. The crude product was filtered and washed with 50% aqueous ethanol to give 24.4 grams.

The crude product was recrystallized, first from 120 cc. of ethanol, and then from an aliphatic hydrocarbon fraction consisting essentially of n-heptane using 1 g. of activated carbon. Yield 12.5 g.; M.P. 96–98.5° C.

The bromoalkylindole analogs of the chloroalkylindoles described above can also be made by the procedure of the foregoing example. For example, 1-benzyl-1-(p-methoxyphenyl)hydrazine hydrochloride may be reacted with 5-bromopentanone-2 to form 1-benzyl-2-methyl-3-(2-bromoethyl)-5-methoxyindole.

Example 3

One gram of 1-benzyl-2-methyl-3-(2-chloroethyl)-5-methoxyindole prepared as described in Example 1 was combined with 50 ml. of 28% aqueous ammonium hydroxide and 75 ml. of ethanol in a flask. The flask was stoppered and stirred for five days while being maintained at room temperature. The solution was clear after three days. At the end of five days, the reaction mixture was concentrated in vacuo to about 50 ml. Five ml. of 30% caustic soda solution were added to the reaction mixture. The reaction mixture was extracted with two 20-ml. portions of ether. The two ether portions were combined and washed with 15 ml. of water and then acidified by the addition of approximately 1.5 ml. of 2 N ethanolic hydrogen chloride. The addition of the ethanolic hydrochloride caused a precipitate to form. The precipitate was filtered, washed with ether and air dried. Yield 925 mg. (88%), M.P. 240°–242° C. U.V.: inflection at 2980 A., A% 203, λmax. 2815 A., A% 249; λmax. 2245 A., A% 870.

Example 4

One gram of 1-benzyl-2-methyl-3-(2-chloroethyl)-5-methoxyindole prepared as described in Example 1 was combined with 50 ml. of ethanol which had been saturated with ammonia gas at 10° C. The mixture was heated in a bomb at 80° C. for 24 hours. The reaction product mixture was concentrated in vacuo to about 10 ml., and 3 ml. of 30% aqueous caustic soda solution and 25 ml. of water were added. The reaction product mixture was then extracted with two 20-ml. portions of ether. The ether was washed with 15 ml. of water and acidified with approximately 1.5 ml. of 2 N ethanolic hydrogen chloride. This caused precipitation of 1-benzyl-2-methyl-3-(2-aminoethyl)-5-methoxyindole hydrochloride. This product was filtered, washed with ether and air dried. Yield 750 mg. (71.5%); M.P. 239°–241° C.

The procedure of either Example 3 or Example 4 may be used for the amination of other haloalkylindoles beside those mentioned. For example, 1-benzyl-2-methyl-3-(2-chloropropyl)-5-methoxyindole can be converted to 1-benzyl-2-methyl-3-(2-aminopropyl)-5-methoxyindole hydrochloride.

The procedures of Examples 3 and 4 may be modified to recover the product as a free amine or as an acid addition salt other than the hydrochloride. The product may be recovered in the form of acid addition salts such as the hydrobromides or the sulfate by addition of an alcoholic solution of the appropriate acid, viz. hydrogen bromide or sulfuric acid, in lieu of the ethanolic solution of hydrogen chloride. The product may also be recovered as the free amine by evaporation of the ether solvent to a small volume.

Example 5

A solution of 5.0 g. of 1-benzyl-2-methyl-3-(2-chloroethyl)-5-methoxyindole in 50 ml. of ethylamine was heated in a bomb at 100° C. for 20 hours. The excess ethylamine was evaporated and the solid residue was dissolved in 50 ml. of ethanol. This solution was diluted with 150 ml. of ether to precipitate 1-benzyl-2-methyl-3-(2-ethylaminoethyl)-5-methoxyindole hydrochloride. Recrystallization was effected by dissolving the product in about 20 ml. of ethanol and adding ether until pure 1-benzyl-2-methyl-3-(2-ethylaminoethyl)-5-methoxyindole hydrochloride was precipitated. Yield 3.2 g.; M.P. 190°–192° C.

*Analysis.*—Calculated for $C_{21}H_{26}N_2O \cdot HCl$: C, 70.28%; H, 7.58%; N, 7.81%. Found: C, 70.32%; H, 7.43%; N, 8.15%.

Example 6

A solution of 3.7 g. of 1-benzyl-2-methyl-3-(2-chloroethyl)-5-methoxyindole in 50 ml. of propylamine was heated in a bomb at 100° C. for 24 hours. The reaction product was treated according to the procedure described in Example 5, except that 30 ml. of ethanol were used to dissolve the reaction product and 75 ml. of ether used to precipitate the crude product. A yield of 2.8 g. of crude 1-benzyl-2-methyl-3-(2-propylaminoethyl)-5-methoxyindole hydrochloride was obtained. The material was recrystallized from an ethanol-ether mixture. Yield 2.5 g.; M.P. 197°–198° C.

*Analysis.*—Calculated for $C_{22}H_{28}N_2O \cdot HCl$: C, 70.86%; H, 7.84%; N, 7.51%. Found: C, 70.67%; H, 7.77%; N, 7.43%.

Example 7

A solution of 2.0 g. of 1-benzyl-2-methyl-3-(2-chloroethyl)-5-methoxyindole in 20 g. of isopropylamine was heated in a bomb at 100° C. for 16 hours. The excess isopropylamine was evaporated on a steam bath, and dilute aqueous hydrochloric acid was added until the solution was acid to Congo red. The crude product precipitated and was filtered. Recrystallization from a methanol-ether mixture yielded pure 1-benzyl-2-methyl-3-(2-isopropylaminoethyl)-5-methoxyindole hydrochloride. Yield 2.0 g.; M.P. 204°–205° C.

*Analysis.*—Calculated for $C_{22}H_{28}N_2O \cdot HCl$: C, 70.85%; H, 7.84%. Found: C, 70.54%; H, 7.92%.

Example 8

A solution of 3.0 g. of 1-benzyl-2-methyl-3-(2-chloroethyl)-5-methoxyindole in 20 ml. of n-butylamine was refluxed for 24 hours. The reaction product was treated according to the procedure of Example 5, except that 25 ml. of ethanol were used to dissolve the residue and 75 ml. of ether were used to precipitate the crude product, which was recrystallized from an ethanol-ether mixture, to yield pure 1-benzyl-2-methyl-3-(2-butylaminoethyl)-5-methoxyindole hydrochloride. Yield 2.0 g.; M.P. 164°–165° C.

*Analysis.*—Calculated for $C_{23}H_{30}N_2O \cdot HCl$: C, 71.38%; N, 7.24%; H, 8.08%. Found: C, 71.63%; H, 8.03%; N, 7.56%.

Example 9

A solution of 5.0 g. of 1-benzyl-2-methyl-3-(2-chloroethyl)-5-methoxyindole in 50 ml. of tert.-butylamine was heated in a bomb at 100° C. for 20 hours. The reaction product mixture was treated according to the procedure of Example 5, except that the residue was dissolved in 50 ml. of methanol, and diluted with 150 ml. of ether, and recrystallized from a methanol-ether mixture, to obtain pure 1-benzyl-2-methyl-3-(2-tert.-butylaminoethyl)-5-methoxyindole hydrochloride. Yield 2.0 g.; M.P. 262° C. (decomposes).

*Analysis.*—Calculated for $C_{23}H_{30}N_2O \cdot HCl$: C, 71.38%;

Example 10

A solution of 5.0 g. of 1-benzyl-2-methyl-3-(2-chloroethyl)-5-methoxyindole in 50 ml. of allylamine was heated in a bomb at 100° C. for 20 hours. The reaction product was treated according to the procedure of Example 5 to recover 1-benzyl-2-methyl-3-(2-allylaminoethyl)-5-methoxyindole hydrochloride. Yield 3.4 g.; M.P. 169°–171° C.

*Analysis.*—Calculated for $C_{22}H_{26}N_2O \cdot HCl$: C, 71.24%; H, 7.34%; N, 7.55%. Found: C, 68.06%; H, 7.40%. Analysis indicates that the product obtained was the monohydrate.

Example 11

A solution of 5.0 g. of 1-benzyl-2-methyl-3-(2-chloroethyl)-5-methoxyindole in 25 ml. of benzylamine was refluxed for 20 hours. The reaction mixture was diluted with approximately 100 ml. of water and made alkaline to litmus with 2.5 N aqueous sodium hydroxide solution. The supernatant liquid was decanted from the reaction product, which was in the form of a thick oil. The oil was washed with about 100 ml. of water to extract impurities, and the water was decanted. The oil was dissolved in 50 ml. of ether and washed with three 50-ml. solutions of water to remove any excess benzylamine. The ether solution was dried with magnesium sulfate. Then dry gaseous hydrogen chloride was added to the dried ether solution until no more 1-benzyl-2-methyl-3-(2-benzylaminoethyl)-5-methoxyindole hydrochloride precipitated. The product was recrystallized from a mixture of methanol and ether. Yield 3.5 g.; M.P. 233° C.

*Analysis.* — Calculated for $C_{26}H_{28}N_2O \cdot HCl$: C, 74.18%; H, 6.94%; N, 6.66%. Found: C, 74.41%; H, 6.70%; N, 6.74%.

Example 12

A solution of 5 g. of 1-benzyl-2-methyl-3-(2-chloroethyl)-5-methoxyindole in 15 ml. DL-1-phenylethylamine was heated at 100° C. in a bomb for 20 hours. The solution was diluted with 150 ml. of ether. Dry hydrogen chloride was added until no more precipitation occurred. A gum was formed. The supernatant liquid was decanted from the gum and 50 ml. of water were added to the gum, which soon solidified. The gum was crude DL-1-benzyl-2-methyl-3-[2-(1-phenylethylamino)ethyl]-5-methoxyindole hydrochloride. Recrystallization from a methanol-ether mixture yielded the pure product. Yield 3.2 g.; M.P. 230°–231° C. (decomposes).

*Analysis.* — Calculated for $C_{27}H_{30}N_2O \cdot HCl$: C, 74.54%; H, 7.18%; N, 6.44%. Found: C, 74.76%; H, 7.14%; N, 6.39%.

Example 13

A solution of 5.0 g. of 1-benzyl-2-methyl-3-(2-chloroethyl)-5-methoxyindole in 20 ml. of 2-phenylethylamine was heated at gentle reflux for 20 hours. The solution was diluted with 150 ml. of ether. Dry gaseous hydrogen chloride was added until no more precipitation occurred. The precipitate of water-soluble 2-phenylethylamine hydrochloride which formed was removed by filtration. Then additional dry gaseous hydrogen chloride was added to the filtrate until no more precipitation occurred. This precipitated 1-benzyl-2-methyl-3-[2-(2-phenylethylamino)ethyl]-5-methoxyindole hydrochloride. This precipitate was collected and washed with about 75 ml. of water. Recrystallization from an ethanol-ether mixture yielded the pure product. Yield 3.6 g.; M.P. 218° C.

*Analysis.* — Calculated for $C_{27}H_{30}N_2O \cdot HCl$: C, 74.54%; H, 7.18%; N, 6.44%. Found: C, 75.12%; H, 7.16%; N, 6.57%.

In lieu of using a chloroalkylindole, a bromoalkylindole may be used as a reagent in the formation of aminoalkylindoles according to the procedures of Examples 5 to 13. For example, 1-benzyl-2-methyl-3-(2-bromoethyl)-5-methoxyindole may be reacted with ethylamine, isopropylamine or butylamine to yield 1-benzyl-2-methyl-3-(2-ethylaminoethyl)-5-methoxyindole hydrochloride, 1-benzyl-2-methyl-3-(2-isopropylaminoethyl)-5-methoxyindole hydrochloride or 1-benzyl-2-methyl-3-(2-butylaminoethyl)-5-methoxyindole hydrochloride, respectively, according to the procedure described in Examples 5 through 13.

Example 14

Five grams (0.0159 mole) of 1-benzyl-2-methyl-3-(2-chloroethyl)-5-methoxyindole, 100 ml. (0.55 mole) of 25% aqueous dimethylamine, and 200 ml. of ethanol were combined and stirred at room temperature for six days. The reaction mixture was concentrated in vacuo until a gummy residue was obtained. The residue was partitioned between 50 ml. of 10% aqueous sodium hydroxide and 75 ml. of ether. The ether was separated and the aqueous phase again extracted with 75 ml. of ether. The ether extracts were combined, washed with water, dried with magnesium sulfate, and then acidified with about 7 ml. of 2 N ethanolic hydrogen chloride. The product, 1-benzyl-2-methyl-3-(2-dimethylaminoethyl)-5-methoxyindole hydrochloride, was filtered. Yield 5.1 g., of crude product, M.P. 192°–197° C. The crude product was recrystallized from ethanol. Yield 4.35 g.; M.P. 197.5°–199° C.

Example 15

A mixture of 1.5 g. of 1-benzyl-2-methyl-3-(2-chloroethyl)-5-methoxyindole, 10 cc. (0.10 mole) of piperidine, and 75 cc. of ethanol were combined and heated at reflux for 24 hours. The mixture was concentrated in vacuo to approximately 5 ml. and 25 ml. of ether were added to dissolve the product. The reaction product mixture was filtered, and the filtrate was washed with two portions of 20 ml. each of water, dried with magnesium sulfate, and then acidified with approximately 2 ml. of 2 N ethanolic hydrogen chloride to precipitate crude 1-benzyl-2-methyl-3-(2-piperidyl-1-ethyl)-5-methoxyindole hydrochloride. The product was filtered and dried to yield 2.2 g. of crude product. The crude product was recrystallized from 50 ml. of ethanol. Yield 1.1 g.; M.P. 253°–256° C.

Example 16

Five g. of 1-benzyl-2-methyl-3-(2-chloroethyl)-5-methoxyindole dissolved in 50 ml. of pyrrolidine were heated in a bomb at 100° C. for 20 hours. The excess pyrrolidine was removed, and the oil residue was dissolved in 100 ml. of water, made alkaline to litmus by the addition of 2.5 N aqueous sodium hydroxide solution, and extracted with two 100-ml. portions of ether. The ether extracts were combined and washed with three 100-ml. of water, and then dried over magnesium sulfate and evaporated, leaving an oily residue. The residue was dried in vacuo to remove all traces of pyrrolidine. The residue was then dissolved in 100 ml. of ether. To this solution dry gaseous hydrogen chloride were added. A precipitate of 1-benzyl-2-methyl-3-(2-pyrrolidyl-1)ethyl-5-methoxyindole hydrochloride was collected. Recrystallization from a mixture of ethanol and ether yielded a pure product. Yield 4.0 g., M.P. 228°–229° C.

*Analysis.* — Calculated for $C_{23}H_{28}N_2O \cdot HCl$: C, 71.76%; H, 7.59%; N, 7.28%. Found: C, 71.37%; H, 7.85%; N, 7.66%.

Example 17

A mixture of 11.5 g. (0.0351 mole) of 1-benzyl-2-methyl-3-(2-chloropropyl)-5-methoxyindole, 375 cc. of absolute ethanol, and 125 cc. of 29% aqueous ammonium hydroxide were stirred at room temperature for four days. The solution was concentrated in vacuo to a small volume and then partitioned between 250 ml. of ether and 100 ml. of aqueous sodium hydroxide. The ether layer containing the dissolved product was separated, and the aqueous layer was extracted with two 50-ml. portions of ether. These portions of ether were combined with the ether solution of the product and the resulting ether solution was washed with water and then acidified with approximately 10 ml. of 3 N ethanolic hydrogen chloride to yield 9.4 g. of crude product, M.P. 220°–222° C. Two recrystallizations from ethanol yield a pure 1-benzyl - 2 - methyl - 3 - (2 - aminopropyl) - 5 - methoxyindole hydrochloride, M.P. 224°–226° C.

*Analysis.* — Calculated for $C_{20}H_{25}N_2O \cdot HCl$: C, 69.75%; H, 7.31%; N, 8.12%; Cl, 10.28%. Found: C, 69.70%; H, 7.34%; N, 8.22%; Cl, 10.41%.

Example 18

A solution of 5 g. of 1-benzyl-2-methyl-3-(2-chloroethyl)-5-methoxyindole in 25 ml. of diallylamine was refluxed for 20 hours. The excess diallylamine was removed in vacuo. The residue was added to 100 ml. of water. The residue was made alkaline by the addition of 28% ammonium hydroxide. The product was present in the residue as an oil. To extract the product two 100-ml. portions of ether were added and the mixture shaken. The ether extracts were then separated, combined, and washed once with water. The ether was evaporated from the extract and the residue was dissolved in a mixture of 20 ml. of ethanol and 80 ml. of ether. Dry hydrogen chloride was added to the ether extract until no further formation of 1-benzyl-2-methyl-3-(2-diallylaminoethyl)-5-methoxyindole hydrochloride took place. The 1 - benzyl - 2 - methyl - 3 - (2 - diallylaminoethyl)-5-methoxyindole hydrochloride formed as an oil. The supernatant liquid was decanted from the oil. The oil was then washed with three 100-ml. portions of ether and dissolved in 50 ml. of ethanol. To this solution 100 ml. of ether were added and ammonium chloride was precipitated. The precipitate was separated from the mother liquor by filtration, and 100 ml. of ether were added to the mother liquor to precipitate the product. Recrystallization from an ethanol-ether mixture yielded a pure product. Yield 3.2 g.; M.P. 164°–165° C.

*Analysis.* — Calculated for $C_{25}H_{30}N_2O \cdot HCl$: C, 73.06%; H, 7.61%; N, 6.82%. Found: C, 73.28%; H, 7.91%; N, 6.55%.

While this invention has been described with reference to specific embodiments thereof, the scope of this invention shall be limited only by the scope of the appended claims.

What is claimed is:

1. A compound of the formula

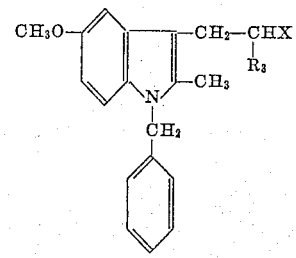

where $R_3$ is selected from the group consisting of hydrogen and methyl, and X is a halogen having an atomic weight in the range of 35 to 80.

2. 1 - benzyl - 2 - methyl - 3 - (2 - chloroethyl) - 5-methoxyindole.

3. 1 - benzyl - 2 - methyl - 3 - (2 - chloropropyl) - 5-methoxyindole.

References Cited in the file of this patent
UNITED STATES PATENTS

| | | |
|---|---|---|
| 2,068,800 | Herdiekerhoff et al. | Jan. 26, 1937 |
| 2,416,258 | Jenkins et al. | Feb. 18, 1947 |
| 2,508,927 | Moe et al. | May 23, 1950 |
| 2,532,047 | Warner et al. | Nov. 28, 1950 |
| 2,642,438 | Duschinsky | June 16, 1953 |
| 2,804,462 | Speeter | Aug. 27, 1957 |
| 2,814,625 | Speeter | Nov. 26, 1957 |
| 2,825,734 | Speeter | Mar. 4, 1958 |

FOREIGN PATENTS

| | | |
|---|---|---|
| 494,069 | Canada | June 30, 1953 |

OTHER REFERENCES

Karmack et al.: Jour. Chem. Soc. (London), page 1878 (1922).

Hill & Kelly: Organic Chemistry, pp. 284–285. The Blakiston Co., May 1943.

Gardner et al.: Jour. A. Chem. Soc., vol. 69, page 3088 (1947).

Murphy: Journal American Pharm. Association, vol. 32, p. 84 (1943).

Shaw et al.: Journal of Pharmacology and Experimental Therapeutics, vol. 116, p. 173 (1956).

Shaw et al.: Journal American Chemical Society, vol. 75, pp. 1877–80 (1953).

Wilkins: New England Journal of Medicine, vol. 255, No. 3, pp. 115–118 (1958).